UNITED STATES PATENT OFFICE.

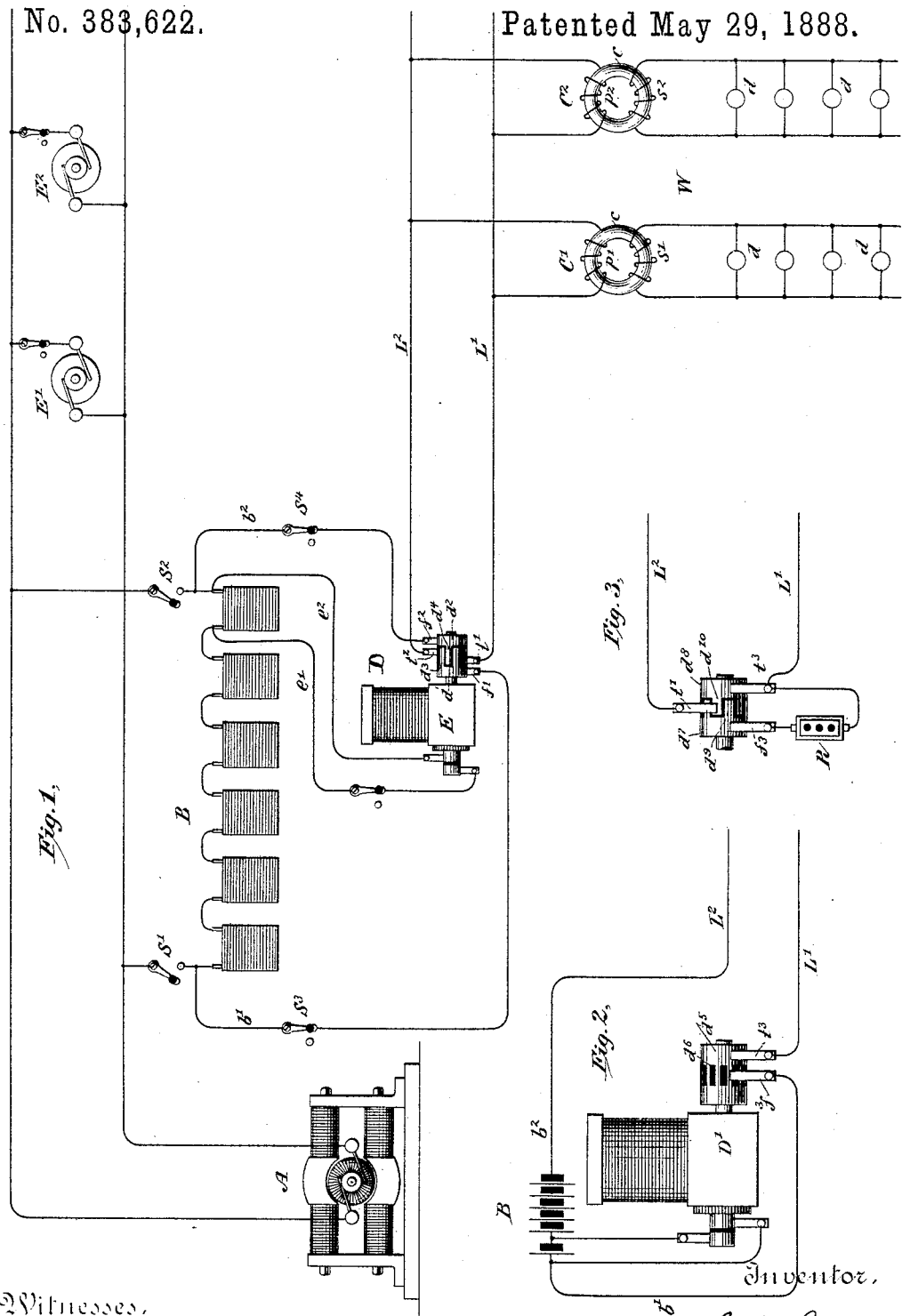

HENRY M. BYLLESBY, OF PITTSBURG, PENNSYLVANIA, ASSIGNOR TO THE WESTINGHOUSE ELECTRIC COMPANY, OF SAME PLACE.

ALTERNATE-CURRENT AND STORAGE SYSTEM OF ELECTRICAL DISTRIBUTION.

SPECIFICATION forming part of Letters Patent No. 383,622, dated May 29, 1888.

Application filed October 1, 1887. Serial No. 251,200. (No model.)

*To all whom it may concern:*

Be it known that I, HENRY M. BYLLESBY, a citizen of the United States, residing in Pittsburg, in the county of Allegheny and State of Pennsylvania, have invented certain new and useful Improvements in a Combined Alternate-Current and Storage System of Electrical Distribution, of which the following is a specification.

The invention relates to an organization of circuits and apparatus whereby currents from a storage-battery may be conveniently employed for operating translating devices connected with a system of alternate-current electric distribution.

The object of the invention is to provide convenient and efficient means whereby currents from any convenient source of electricity may be employed for charging a storage-battery and to utilize the currents from the battery in operating or assisting in the operation of a system of electrical distribution employing alternate, intermittent, or pulsatory electric currents.

The invention consists in employing, in connection with a suitable source of electricity, a storage-battery adapted to be connected with the source at such times as required, and a rheotome or circuit-controlling device whereby the currents from the storage-battery may be rendered intermittent, alternating, or pulsatory, as desired, for supplying the distributing system.

Certain other organizations of storage-batteries with systems of electrical distribution are claimed in other applications of even date herewith, Serial Nos. 251,198 and 251,199, and in an application, Serial No. 265,265, filed February 25, 1888.

In the accompanying drawings there is illustrated in diagram, in Figure 1, a general organization of circuits and apparatus for carrying out the invention. Fig. 2 illustrates the circuit-controller or rheotome more in detail. Fig. 3 illustrates a modification.

Referring to the figures, A represents a source of electric currents, and it may be any suitable form of direct-current machine or a battery of sufficient capacity. The respective poles of this source are connected by means of switches $S'$ and $S^2$ with the poles of a storage-battery, B. This is of any convenient size or number of elements, arranged in any well-known manner for charging. Conductors $b'\, b^2$ are arranged to be connected in this instance with the respective terminals of the storage-battery B, for the purpose of discharging the battery into the translating system to be described. Switches $S^3$ and $S^4$ are employed for controlling the connections. As here represented, switches $S'$ and $S^2$ are opened and switches $S^3$ and $S^4$ are closed.

The work-circuit W consists in this instance of translating devices $d\, d$, arranged in the secondary circuits of converters $C'$ and $C^2$. These converters here consist of secondary coils $s'\, s^2$, connected through the translating devices $d\, d$, and of primary coils $p'\, p^2$, arranged in multiple arc between conductors $L'$ and $L^2$. The coils are wound on cores $c$.

It is desired for this system of distribution that intermittent, alternating, or pulsatory electric currents shall be employed upon the lines $L'$ and $L^2$, for the purpose of operating the converters and producing the requisite currents in the secondary circuits.

The invention is especially applicable to those systems in which currents of high potential are employed upon the primary circuit $L'\, L^2$, and currents of a lower potential for operating the translating devices $d\, d$. In order that the direct currents from the storage-battery may be employed for thus operating the converters, and through them the translating devices, it becomes necessary to provide some means for changing the direct current from the storage-battery into intermittent, pulsatory, or alternating currents. The device D, here shown for that purpose, consists of a rheotome adapted to be revolved at a high rate of speed in any convenient manner—as, for instance, by an engine, or by an electric motor, E, driven by currents derived through conductors $e'\, e^2$ from the storage-battery, or from any other convenient source. This rheotome here consists of two contact rings or plates, $d'\, d^2$, having teeth or plates $d^3\, d^4$ alternating with each other. The conductors $b'\, b^2$ are connected with the rheotome through brushes $f'\, f^2$, which rest continuously upon the respective rings, while the conductors L' L² are connected with brushes t' and t², which make alternate contact with the two plates through alternating teeth. In this manner alternating impulses will be transmitted upon the lines L' and L², and these will be converted into secondary or induced currents which may be employed for operating the translating devices, or for operating any system of alternating or secondary electric distribution. Direct-current machines or apparatus may be driven by currents derived from the generator A—for instance, electric motors, as shown at E' E².

In some instances it may be desired to employ intermittent or pulsatory electric currents upon the line L' and L².

In Fig. 2 there is shown a rheotome, D', adapted to render the current from the battery B intermittent. This is accomplished by connecting one terminal of the battery B, through the conductor b' with a brush, $f^3$, resting upon a conducting-ring, $d^5$. This ring has interposed plates $d^6$ of non-conducting material, which pass beneath the brush $f^3$ as the ring revolves. The line L' is connected with the ring $d^5$ through the brush $t^3$. The line L² is connected with the conductor $b^2$, leading from the remaining pole of the battery. The rheotome is revolved as in the former instance.

In case pulsatory currents are required, the device illustrated in Fig. 3 may be employed. This consists in employing two insulated plates or rings, $d^7$ and $d^8$, and the two brushes $f^3$ and $t^3$, connected as before. The brush $t'$ makes contact with the two rings alternately through the teeth $d^9$ and $d^{10}$. The plate $d^7$ is connected with the plate $d^8$ or the line L' through a resistance, R, so that the resistance is alternately introduced into and withdrawn from the circuit, thus causing a pulsatory current.

I claim as my invention—

1. The combination of a source of electricity, a storage-battery, means for connecting the same with the source, a system of intermittent, pulsatory, or alternate-current electric distribution, and a rheotome through which the storage-battery is connected with the supply-conductors of said system.

2. The combination, with a source of electricity, of a storage-battery, means for connecting the same with the source, a system of translating devices designed to be operated by alternating currents, electric converters having their secondary coils connected with such translating devices, a rheotome, and means for connecting the primary coils of such converters with said storage-battery through said rheotome.

3. The combination of a source of electricity, a storage-battery, means for charging the same from said source, a rheotome for transforming direct into alternating, intermittent, or pulsatory currents, an alternate-current system of distribution and translation, and means for connecting the storage-battery with said system through said rheotome.

4. The combination, with a system of distribution and translation by secondary electric currents, of a storage-battery, a direct-current generator for supplying direct electric currents to the storage-battery for charging the same, devices operated by direct currents from said generator, a rheotome, and switches for connecting the storage-battery through the rheotome with the distributing system.

5. The combination, with a source of electricity, of a storage-battery charged from said source, a system of electric distribution requiring intermittent or pulsatory electric currents, a rheotome for transforming currents from said storage-battery into alternating, intermittent, or pulsatory currents, and an electric motor for driving the rheotome operated by currents from the storage battery.

In testimony whereof I have hereunto subscribed my name this 5th day of September, A. D. 1887.

HENRY M. BYLLESBY.

Witnesses:
W. D. UPTEGRAFF,
D. W. EDGECOMB.